Nov. 15, 1938. G. A. ROCKALL ET AL 2,136,756
LOG FOR MEASURING THE DISTANCE TRAVELED BY WATER-BORNE VESSELS
Filed May 17, 1935 3 Sheets-Sheet 2

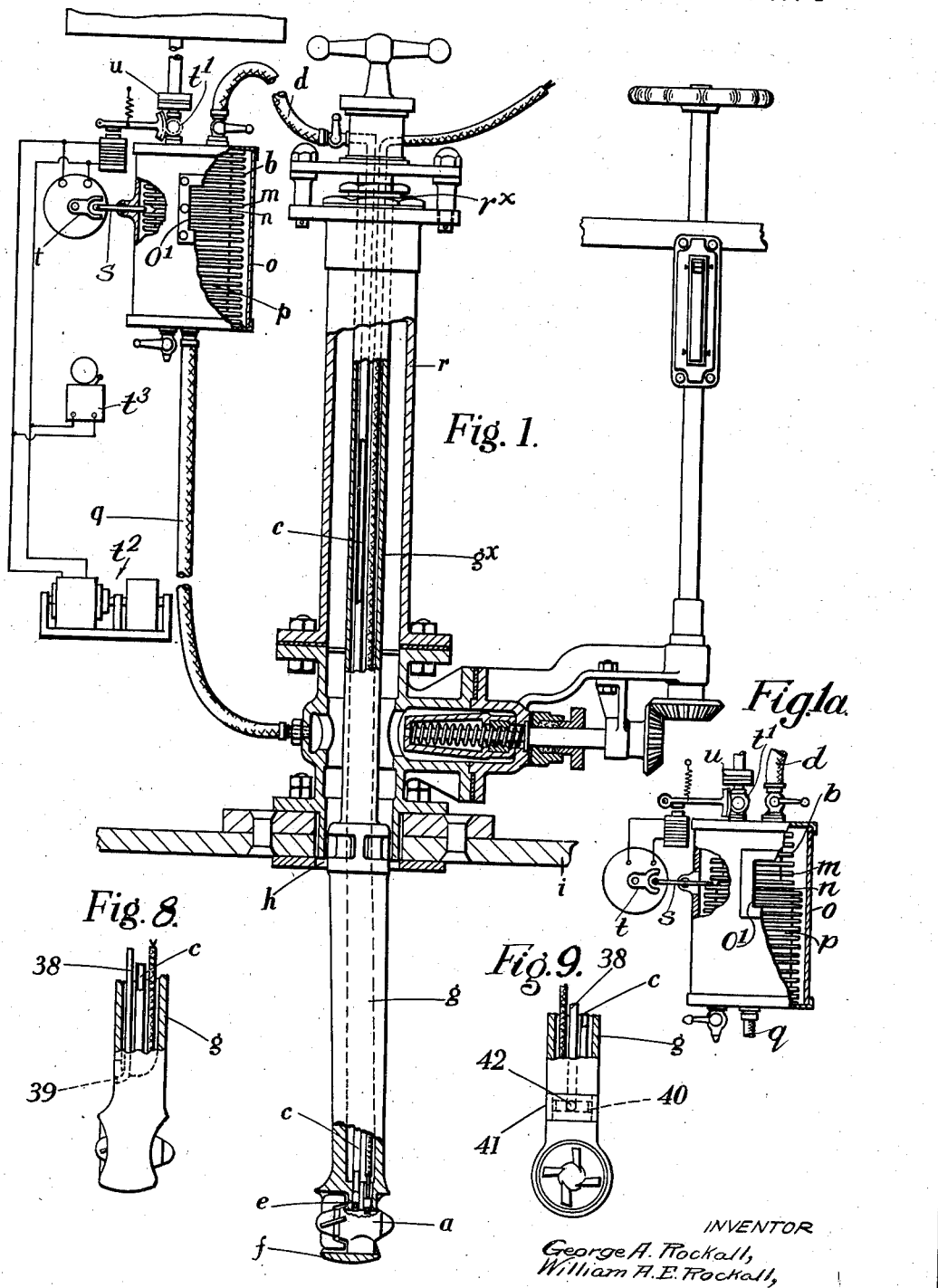

INVENTOR
George A. Rockall,
BY William A. E. Rockall,
Richard E. Babcock
ATTORNEY

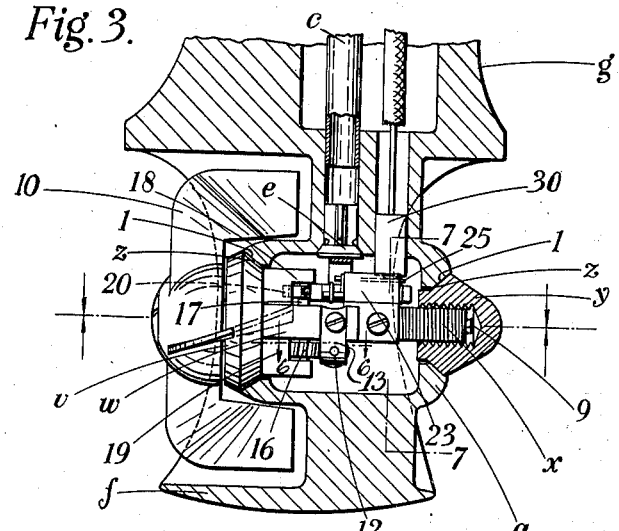
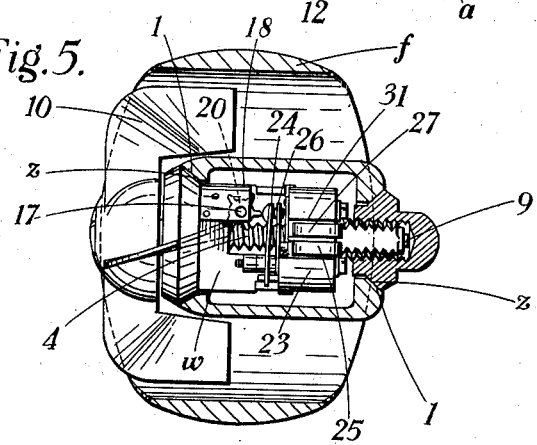
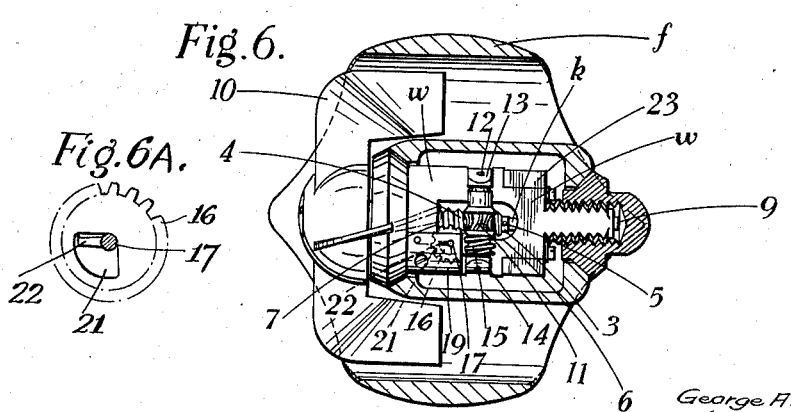

Patented Nov. 15, 1938

2,136,756

UNITED STATES PATENT OFFICE 2,136,756

LOG FOR MEASURING THE DISTANCE TRAVELED BY WATER-BORNE VESSELS

George Alfred Rockall and William Albert Edward Rockall, London, England, assignors to Wsevolod Pavlovitch Ampenoff, London, England Application May 17, 1935, Serial No. 22,100
In Great Britain May 29, 1934

4 Claims. (Cl. 73—122)

This invention relates to submerged logs for measuring the distance traveled by water-borne vessels of the kind in which an impeller-driven shaft operates an electric circuit-making and breaking device contained by a submerged casing provided with a single opening through which the aforesaid impeller-shaft passes.

In order to prevent water entering the aforesaid casing, it is completely filled with oil but owing to the varying difference between the pressures within and outside the casing, due (a) to its varying distance beneath the surface of the water when the vessel rises and falls; (b) to variations of temperature and (c) to the horizontal movement of the vessel, it is found that water sometimes gains entrance, particularly after the aforesaid shaft or its bearing has commenced to wear. As water in the submerged casing is liable to short-circuit the contacts of the make-and-break device and to cause parts of the mechanism to corrode, it is necessary to exclude it.

The object of the present invention is to provide means for keeping the submerged casing completely filled with oil and to produce a normal tendency for the oil to flow out between the impeller-shaft and its bearing so as to preclude the possibility of water passing between them in the reverse direction. To this end the casing is connected by a conduit, which may have a non-return valve, with an oil reservoir that keeps it filled with oil. This oil reservoir is situated within the vessel at a convenient height above the submerged casing, and a pressure that is not more than sufficient to prevent the entry of the water surrounding the submerged casing, is applied to the contained oil. It will be understood that if more than sufficient pressure is applied to the oil in the submerged casing a very considerable wastage of oil will result during a voyage. This waste is avoided if the pressure applied to the oil in the submerged casing is such that, when added to the capillary force of the oil in the bearing of the impeller shaft, it slightly preponderates over the pressure of the water outside the submerged casing. In order to serve this purpose the oil reservoir or an equivalent chamber is collapsible or provided with a diaphragm, or an equivalent part of suitable area that is acted upon by the pressure of the water outside the submerged casing. In addition to this the impeller-shaft or its bearing or both may be provided with a helical groove that will impart to the film of oil between them, a tendency to move in an outward direction. In this case the said shaft or bearing may also be provided with one or more annular grooves between the aforesaid helical grooves and the outer end of the bearing, to prevent the oil passing out too quickly.

According to one construction, the oil reservoir is a bellows-like chamber which is free to expand or contract within a vertical cylinder situated within the vessel below the water level, to the upper end of which cylinder the aforesaid bellows-like chamber is connected. A second bellows-like pressure chamber is supported beneath the one first mentioned and is similarly connected at its outer end to the lower end of the cylindrical holder and communicates with the water in which the submerged casing is situated so that the pressure due to the head of water above the pressure chamber and to the horizontal movement of the vessel when it is under way, is added to the pressure in the submerged casing due to the head of oil between the oil reservoir and the submerged casing.

The cylinder that contains the bellows-like chambers may be provided with a suitable opening through which the bottom of the oil reservoir can be seen in order that it may be recharged with oil when necessary. In some cases the movement of the collapsible end of the oil reservoir may close an electric circuit adapted to operate an audible or other alarm, or to start a motor driven pump so as to recharge the reservoir automatically.

Flexible pipes or other suitable conduits connect the respective bellows-like chambers with the submerged casing and with the water in which the latter is immersed. The aperture through which the bore connected with the pressure chamber communicates with the water, may emerge in an annular channel formed on the outboard arm which is enclosed by a ring or sleeve provided with a hole that may be caused to face any direction by turning the said ring.

In order that the present invention may be clearly understood, it will now be described with reference to the accompanying drawings, in which—

Fig. 1 is an elevation partly in section, showing diagrammatically one form of the present invention applied to a ship's log of the kind referred to, Fig. 1a is a part sectional elevation of a detail of a modified construction, Fig. 2 is a sectional elevation on an enlarged scale showing the connections between the oil reservoir and the conduit in the log shaft leading to the submerged casing, Fig. 3 is a vertical section through the lower end of the outboard arm, guard tube and submerged casing on an enlarged scale, Fig. 4 is a detail showing the removable end pieces of the submerged casing in section with the impeller and its shaft in elevation but omitting other parts, Fig. 4a is a detail showing a modified form of one of the removable end-pieces of the submerged casing in section, with the rotator shaft removed so as to show a helical and an annular groove in its bearing, Fig. 5 is a sectional plan through the submerged casing, in the plane of the broken line in Fig. 3, Fig. 6 is a horizontal section in the same plane as Fig. 5 viewed from beneath, Fig. 6a is a sectional plan of a detail hereinafter referred to, in the plane indicated by the line 6—6 in Fig. 3, Fig. 7 is a sectional view in the plane indicated by the line 7—7 in Fig. 3, Fig. 8 is a side elevation of a detail forming part of a modified construction, and Fig. 9 is a front elevation of a modified form of the same part.

According to the construction illustrated by Figs. 1 to 7, a submerged casing $a$ is connected to an oil reservoir $b$ by a conduit $c$, $d$ provided with a non-return valve $e$, which constantly keeps it full of oil. The submerged casing $a$ is rigidly supported co-axially in a guard tube $f$ carried by an outboard arm $g$ that extends through a suitable opening $h$ in the ship's hull $i$ and is provided with a rotator shaft $k$ that is also supported co-axially with the aforesaid guard tube $f$ in a long bearing $l$, the common axes of which are parallel with the direction of flow of the water past the ship, as described in Chernikeeff's United States specification No. 1,421,405 issued July 4th, 1922 and United Kingdom specification No. 193,254 dated February 1st, 1922.

The outboard arm $g$ extends from the end of a log shaft $g^x$ that passes through a gland $r^x$ at the upper end of a log casing $r$. This casing surrounds the opening $h$ in the hull $i$ and prevents water from entering the interior of the ship.

The oil reservoir $b$ is elastic and consists of a cylindrical vessel composed of flexible sheet metal provided with deep annular corrugations $m$. This vessel is closed at its lower end $n$ which is free to move and is fixed to the upper end of a cylindrical guide $o$ above a similar similar corrugated cylinder that is closed at its upper end and fixed at its lower end to the bottom of said guide. The cylindrical guide $o$ has an inspection opening $o'$. The lower cylinder $p$ (hereinafter called the "pressure chamber") is connected to the water in which the submerged casing $a$ is immersed, by a conduit $q$ and the log casing $r$ which communicates with the water outside the ship. In this way the pressure of the head of water between the pressure chamber $p$ and the surface of the water, is added to the pressure of the head of oil in the conduit $c$ $d$ between the oil reservoir $b$ and the submerged casing $a$. By making the cross-sectional area of the pressure chamber $p$ greater than that of the oil reservoir $b$ as shown in Fig. 1a the pressure in the submerged casing is further augmented so as to insure that the water outside the submerged chamber will not enter it.

When the supply of oil in the reservoir $b$ is diminished the pressure chamber $p$ will expand and turn the lever $s$ which will actuate the switch $t$ and open an electrically-operated inlet valve $t^1$ which will deliver oil under suitable pressure to the reservoir $b$ through a non-return valve $u$; or drive an electro-motor $t^2$ adapted to operate a pump; or operate an alarm device $t^3$. When the supply of oil in the reservoir $b$ has been replenished, the said reservoir will expand and turn the lever $s$ in the reverse direction and through it operate the switch $t$ so as to close the valve $t^1$ or stop the pump.

The submerged casing $a$ has two removable end-pieces one of which indicated by the reference character $v$ has a plate $w$ extends horizontally through the centre of the submerged casing and is provided with a screw-threaded extension $x$ that is engaged by the other end-piece $y$ which is screw-threaded to receive it. Both these end-pieces have conical faces $z$ that are drawn into water-tight engagement with conical seats $I$ formed at the ends of the submerged casing when they are screwed together.

The end-piece $v$ and the plate $w$ are bored so as to form a long bearing $l$ for the impeller shaft $k$ which, when the end-pieces are in position, lies on the centre line of the submerged casing. A sleeve 3 provided with a worm 4 is secured by a pin 5 to the impeller shaft $k$ in a gap 6 formed in the plate $w$ and the end of this sleeve forms a shoulder 7 that retains the impeller shaft in its bearing while the thrust in the opposite direction is taken by a step 8 whose position can be accurately adjusted by a screw 9.

An impeller 10 is fixed on the shaft $k$ and is rotated by the water in which it is immersed when there is relative movement between them. This water is constrained to flow in a direction parallel to the impeller shaft by the guard tube $f$. In this way any part of the driving effort that is not utilized in rotating the shaft $k$ is carried by the step, 8, while the long bearing $l$ only serves to keep the impeller shaft in line, and as the oil that flows into this bearing from the submerged casing $a$ is evenly distributed around the shaft by capillary force, the latter floats in a film of oil.

The worm 4 engages and drives a worm-wheel 11 fixed to a transverse shaft 12 carried in bearings 13, 14 beneath the plate $w$. This shaft 12 also carries a worm 15 that engages and drives a worm-wheel 16 mounted loosely on a vertical shaft 17 which is carried in bearings formed in the brackets 18, 19 secured to the plate $w$. The worm-wheel 16 has a wide channel 21 in its bore that is entered by a pin 22 fixed to the shaft 17 by which the latter is driven when one side of the said channel engages the said pin as shown in Fig. 6a. A cam 20, hereinafter referred to, is fixed to the shaft 17.

The plate $w$ also carries a block 23 of insulating material that supports two pairs of spring contacts 24, 25 and 26, 27 of which 24 and 25 are in metallic contact with each other but are normally insulated from the contacts 26 and 27 which are also metallically connected.

When the end-pieces $v$ $y$ and their supported parts are in position in the submerged casing, the contacts 25, 27 make metallic contact with the insulated leads 28, 29 that pass into it from the outboard arm $g$ through an insulating plug 30.

In operation, the projections on the cam 20 successively engage the spring contact 24 and cause it to make contact with the contact 26 so as to close the circuit of an indicating or recording apparatus on the ship, through the leads 28, 29. After the contact has been made, and the cam has moved beyond its highest position, the spring contact 24 quickly breaks the circuit by turning the cam 20 and the shaft 17 that carries it until its driving pin 22 engages the other side of the channel 21 in the worm-wheel 16.

The contacts 25, 27 lie in a channel 31 formed in the block 23 which is entered by the extremity of the insulating plug 30 which maintains the parts in the correct angular position.

According to a modified construction, the conduit $q$ is connected to a tube 38 within the log shaft $g^x$ that communicates with an opening 39 in the front of the outboard arm, as shown in Fig. 8, or with an annular groove 40 formed on the said outboard arm $g$ that is surrounded by a rotatable sleeve 41 provided with an opening 42 that may be caused to face any desired direction, as shown in Fig. 9. With either of these arrangements the pressure due to movement through the water may be added to the hydrostatic pressure.

In order to resist any tendency of the water to enter the submerged casing $a$ between the rotator shaft $k$ and its bearing $l$, either or both of them may be provided with a helical groove as shown at 43 in Fig. 4 and at 42 in Fig. 4a adapted to impart an outward tendency to the film of oil between them. An annular groove 44 may also be employed to prevent the oil passing out too quickly.

It will be understood that the constructions herein described and shown constitute different modes of carrying out the present invention and that such constructions may be further modified without departing from the spirit of the invention.

We claim:—

1. A ship's log comprising a closed submerged chamber; means for rigidly supporting same outside the ship; a make-and-break device within said chamber; a shaft to drive said make-and-break device, extending through one of the walls of said chamber; a bearing in said wall in which said shaft is journalled and a rotator mounted on said shaft outside said chamber, to drive said shaft when the rotator is moved relatively to the water in combination with a resilient collapsible oil reservoir inside said ship, fixed at one end; a conduit connecting said reservoir and said submerged chamber to keep the latter filled with oil; a resiliently-collapsible pressure chamber of greater cross-sectional area than said oil reservoir fixed at one end; a connection between the free end of said resiliently-collapsible pressure chamber and the free end of said reservoir; a conduit connecting the interior of said resiliently-collapsible pressure chamber with the water outside the ship so as to apply to the oil in said reservoir a pressure greater than that of the water in said resiliently-collapsible pressure chamber and leads to connect the make-and-break device in the submerged chamber to an indicating device inside the ship substantially as set forth.

2. A ship's log comprising a closed submerged chamber; means for rigidly supporting same outside the ship; a make-and-break device within said chamber; a shaft to drive said make-and-break device, extending through one of the walls of said chamber; a bearing in said wall in which said shaft is journalled and a rotator mounted on said shaft outside said chamber, to drive said shaft when the rotator is moved relatively to the water in combination with an oil reservoir inside said ship; a conduit connecting said reservoir and said submerged chamber to keep the latter filled with oil; said reservoir having a movable wall; means of applying the pressure of the water outside the ship to said movable wall to transmit sufficient pressure to the oil in said reservoir and submerged chamber to prevent the entry of water into the later; an electric switch adapted to be operated by said movable wall when the volume of the oil in said reservoir is decreased to a predetermined minimum; an oil supply; an electrically driven oil pump adapted when said switch is closed to recharge said reservoir with oil until a desired maximum volume is reached and leads to connect the make-and-break device in the submerged chamber to an indicating device inside the ship substantially as set forth.

3. A ship's log comprising a closed submerged chamber; an outboard arm for rigidly supporting same outside the ship; a make-and-break device within said chamber; a shaft to drive said make-and-break device, extending through one of the walls of said chamber; a bearing in said wall in which said shaft is journalled and a rotator mounted on said shaft outside said chamber, to drive said shaft when the rotator is moved relatively to the water in combination with an oil reservoir inside said ship; a conduit connecting said reservoir and said submerged chamber to keep the latter filled with oil; means acted upon by the pressure of the water outside the ship for controlling the pressure of the oil in said reservoir; a conduit connecting said pressure controlling means with an annular channel surrounding said outboard arm; a rotatable sleeve having an aperture therein mounted on said outboard arm over said annular channel so as to maintain the pressure of the oil inside the submerged chamber sufficiently high to prevent the entry of water under the pressure due to depth of immersion and the speed of the ship and leads to connect the make-and-break device in the submerged chamber to an indicating device inside the ship substantially as set forth.

4. A ship's log comprising a closed submerged chamber; means for rigidly supporting same outside the ship; a make-and-break device within said chamber; a shaft to drive said make-and-break device, extending through one of the walls of said chamber; a bearing in said wall in which said shaft is journalled and a rotator mounted on said shaft outside said chamber, to drive said shaft when the rotator is moved relatively to the water in combination with a collapsible oil reservoir inside said ship; a conduit connecting said reservoir and said submerged chamber to keep the latter filled with oil; an elastic pressure chamber in contact with said elastic oil reservoir; said supporting means including a hollow log shaft and a hollow outboard arm extending into the water from said log shaft; a conduit from said pressure chamber passing through said hollow log shaft and outboard arm and communicating through a bore in said outboard arm with the water near the submerged chamber so that an unbroken body of water in said conduit will maintain the pressure of the oil supplied to the submerged chamber sufficiently high to prevent the entry of water; means for indicating when the oil in said reservoir is reduced to a predetermined minimum and leads to connect the make-and-break device in the submerged chamber to an indicating device inside the ship substantially as set forth.

GEORGE ALFRED ROCKALL.
WILLIAM ALBERT EDWARD ROCKALL.